Nov. 26, 1968 A. FURMAN 3,413,622

DRIVE-SENSE LINE WITH IMPEDANCE DEPENDENT ON FUNCTION

Filed April 5, 1965 2 Sheets-Sheet 1

INVENTOR
ANATOL FURMAN

BY Carl C. Kling

ATTORNEY

United States Patent Office 3,413,622

Patented Nov. 26, 1968

3,413,622
DRIVE-SENSE LINE WITH IMPEDANCE DEPENDENT ON FUNCTION

Anatol Furman, Fishkill, N.Y., assignor to International Business Machines Corporation, Armonk, N.Y., a corporation of New York Filed Apr. 5, 1965, Ser. No. 445,306
4 Claims. (Cl. 340—174)

ABSTRACT OF THE DISCLOSURE

A magnetic core storage having a common drive sense system which is electrically balanced with respect to the sensing apparatus while presenting different termination impedances to drive signals and sense signals.

*Introduction.*—The balanced drive sense system of this invention is particularly useful in an inhibit sense system of a three dimensional magnetic core storage device. The balancing is advantageous in preventing saturation of the transistors in the sense system by the relatively great inhibit signals. The different terminating impedances are required in reconciling the need for high current drive into a low impedance termination with the need for high impedance nonreflective termination for the output voltage signals.

*Characteristics of invention*

*Environment.*—Magnetic storage devices generally include an array of magnetic cores, a drive system for selecting at one time a small group of those magnetic cores for accessing, and a sensing system for receiving the outputs from the cores and amplifying them to usable levels. The nature of the devices is such that the drive currents and voltages are significantly greater than the output signals. The entire matrix is closely packed, with the drive conductors having capacitive and inductive stray coupling to each other. The drive signals are thus coupled to the sensing mechanism in such fashion that the sensing mechanism is "saturated," that is, the sensing mechanism cannot sense output signals because it requires time to recover from the results of the previous drive signal.

In a magnetic core matrix memory it is common to select a group of cores called a "word" by coincident half select signals on X and Y wires which intersect at the core. Selection of a particular X wire and selection of a particular Y wire each with half select current provides to the magnetic core at their intersection a magnetic force which is sufficient to drive that core to magnetic saturation in either of its two directions. The other cores traversed by the selected X wire and the selected Y wire are not driven away from their respective data states, since they receive half select drives only. The nature of the cores is such that half select drive does not significantly alter their magnetic state. Such cores are identified as having rectangular hysteresis.

In magnetic core matrix memories of the three-dimensional type, an inhibit function is performed on certain cores during the write operation and the sense function is performed during a subsequent read operation. The inhibit function permits X–Y selection of a word and inhibit control of bit values within the word. The inhibit function and the sense function are never performed at the same time. Inhibit and sense functions can use identical winding configurations; it is thus possible to operate with a common inhibit-sense system. This permits a magnetic core array having only three wires through each core, the X wire, the Y wire, and the inhibit-sense wire. In such common inhibit sense systems, however, it is necessary to protect the sense amplifier from the relatively great inhibit drive signal. In such systems it has become usual to provide a balanced sense system so that a differential connection across the sense amplifier will permit rejection of the inhibit drive signal. The inhibit signal is applied to the sense amplifier in differential mode from two sources in such fashion that it cancels. The output signal, however, is applied to only one input of the sense amplifier and thus provides a voltage which can be amplified and used.

In any sense amplifier application, there are two recovery problems, sense amplifier saturation and sense line energy retention.

The sense amplifiers, previously subjected to over voltages by the bit drive, may be saturated and consequently be unable to amplify input signals.

Energy lift in the bit line from the previously applied current appears at the input of the sense amplifier, as a decaying voltage.

Various methods for protecting the sense amplifier from the inhibit driver in common inhibit-sense systems have been used. As the memory cycle is speeded and as increases are made in the number of cores wound on an individual inhibit-sense wire, further improvement is required in the mechanism for protecting the sense amplifier from the inhibit driver.

*Objects.*—A object of the invention is to provide, in an inhibit-sense system for a magnetic core matrix memory, improved protection to the sense amplifier, from the inhibit signal.

Another object is to provide, in a common bit-sense system for a magnetic memory, an improved termination for bit drive signals and output signals.

*Features.*—A feature of the invention is a termination connection, including diodes, a transformer, and resistances equal to the characteristic impedance, which provide a low resistance path to ground for the inhibit drive currents at write time, dissipates energy remaining in the system following write time, and yet terminates the inhibit sense system in the characteristic impedance at the following read time.

Another feature of the invention is the connection of a balancing transformer and the sense amplifiers at the termination end of the inhibit sense wire, which reduces the amount of common mode noise which the sense amplifier must reject and provides for faster sense line recovery.

*Advantages.*—The advantage of the invention over previous common bit-sense systems is its higher speed response, both with respect to bit, or inhibit, drive signal propagation and with respect to sense amplifier and sense line recovery.

The foregoing and other objects, features, and advantages of the invention will be apparent from the following more particular description of a preferred embodiment of the invention, as illustrated in the accompanying drawings.

*Description of embodiment*

*Drawings.*—FIGURE 1 is a simplified schematic drawing of the invention.

*Summary*

Figure 1:
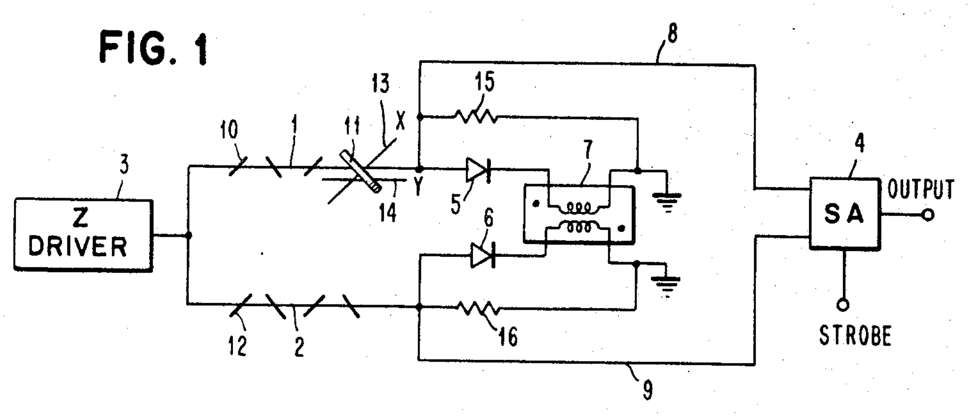

The invention is a common conductor bit-sense system for a magnetic core memory, in which the common conductor is terminated in a low impedance with respect to the bit drive signal, and in the characteristic impedance with respect to information signals and sense line recovery.

In the write operation, bit driver 3 provides current evenly to two common bit-sense conductors 1 and 2. The drive pulse forward biases diodes 5 and 6, providing a low impedance path to ground. Transformer 7 enforces an equality of current flow through conductors 1 and 2. Sense amplifier 4, connected differentially across conductors 1 and 2, is affected by only the diode voltage drop (about 1 volt) which is presented in common mode for rejection by the differential input of the sense amplifier. The sense amplifier thus is saturated only to a minimum extent and can quickly recover.

In the following read operation, a selected core provides an output signal which passes along one of the two bit-sense conductors 1 and 2. The output signal is in the millivolt range, too small to forward bias diodes 5 and 6 which remain in the high impedance state. The bit-sense conductors 1 and 2 are terminated at this time in their characteristic impedances by resistances 15 and 16, respectively.

*Description of FIGURE 1*

FIGURE 1 illustrates the invention in simplified form. Two strings of cores, on bit-sense wires 1 and 2, are connected to a common inhibit driver (Z-driver) 3, and to differential inputs of sense amplifier 4. During operation Z-driver 3 provides inhibit current to both wire 1 and wire 2, even though inhibit current may be required only by one or the other of the two strings of cores. The inhibit current output of Z-driver 3 divides equally along wires 1 and 2, passes respectively through diodes 5 and 6, and through balancing transformer 7 to ground. Balancing transformer 7 insures that the currents along wire 1 and along wire 2 are equal; any imbalance will cause the creation of equal and opposite current in the opposite winding of transformer 7 to correct the imbalance. The voltage of the inhibit pulse from Z-driver 3 is coupled directly by conductors 8 and 9 to the differential inputs of sense amplifier 4. These signals are maintained equal by the original division of current along wires 1 and 2 and by the effects of balancing transformer 7. The net result on the sense amplifier is that the sense amplifier sees on each of its differential inputs the threshold voltage required for forward biasing diodes 5 and 6, which threshold is less than 1 volt and normally is matched within several hundredths of a volt. These small voltages, although generally larger than the signal voltage, occur at a time other than signal time and do not drive the transistors in sense amplifier 4 beyond a condition of very temporary saturation. Sense amplifier 4 can then "recover" from the inhibit drive signal in time to accept the very small sense signals which occur later at "read" time.

At read time, which occurs at a time after the sense amplifier has recovered from the inhibit drive, X and Y drives not shown in FIGURE 1 cause one of the cores to switch from an "1" to a "0" state and provide an output. Representative cores 10, 11 and 12 are marked, although in actual practice there might be as many as several thousand cores, for example 2,048 cores, on each of windings 1 and 2. Assume that core 11 is switched as a result of read currents provided on X winding 13 and Y winding 14. Core 11 in such case provides an output signal as a result of magnetic excursion. The output signal traverses wire 1 until it reaches diode 5; the output signal being much small than 1 volt threshold of diode 5, the output signal faces, in the diode leg, what amounts to an open circuit. The output signal passes along conductor 8 to the top differential input of sense amplifier 4. The output signal is also terminated to ground by terminating resistance 15, of characteristic impedance value, which prevents reflections. Resistance 16 similarly provides a characteristic impedance termination to output signals developed along conductor 2.

*Operation—pulse program*

Figure 2:
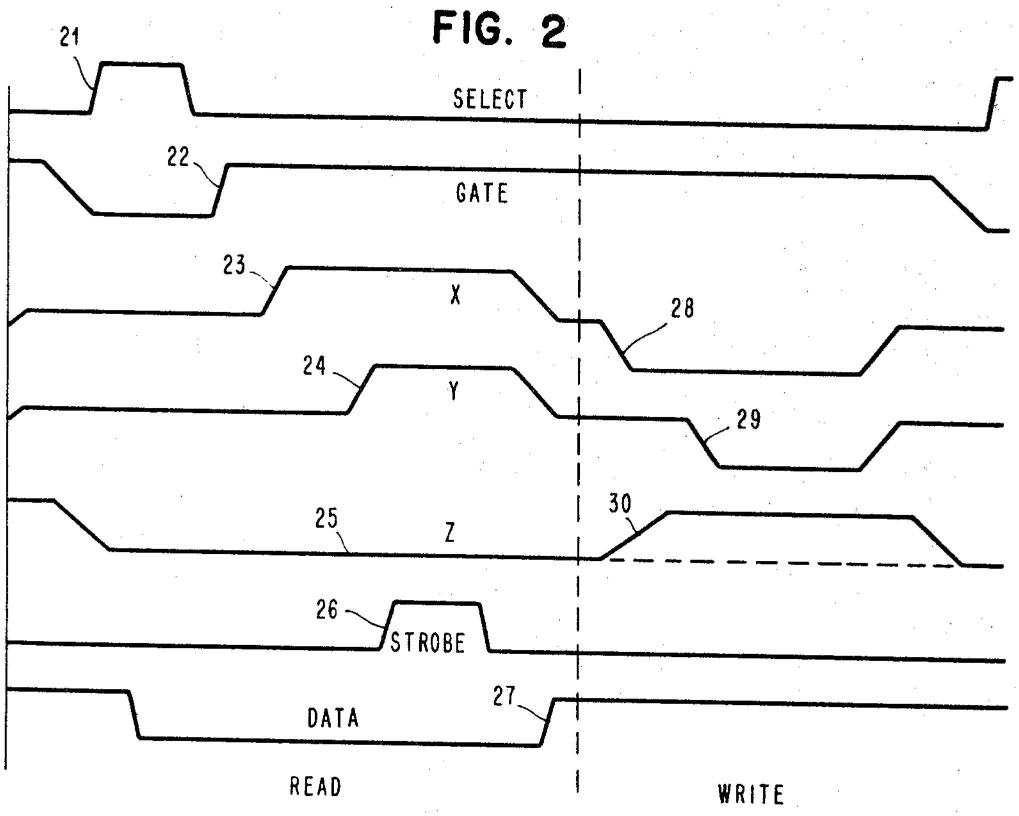
FIGURE 2 is a timing diagram showing a pulse program suitable for operating a magnetic core memory according to the invention.

In operation, the memory functions according to the pulse program shown in FIGURE 2. The memory is selected by a select pulse 21. Gate pulse 22 conditions the X and Y drive wire circuits for conductance.

Slightly thereafter X pulse 23 conditions the X drivers, providing read current. After the noise transient developed by the rise of the X currents produced under control of X pulse 23 has had a chance to subside, Y control pulse 24 causes conduction of the Y drivers. Since this is read time the inhibit driver is inactive. The coincidence of X current and Y current at the selected magnetic cores, which in FIGURE 1 might include core 11, drives all cores of the word to "0" value. Those cores which previously were saturated at the "0" value do not undergo any magnetic excursion and provide effectively zero outputs signal. Those cores, however, which previously were set at the "1" value are are driven to zero.

The magnetic excursion from the "1" value to the "0" value induces a relatively large output signal onto the associated inhibit sense conductor. This output signal is delivered to the appropriate sense amplifiers, such as sense amplifier 4 in FIGURE 1, in differential mode at the differential inputs. The sense amplifier thus is prepared to provide the signal indicative of the fact that a "1" had been stored in the selected core.

The purpose of terminating the inhibit-sense conductors 1 and 2 in their characteristic impedances is to dissipate the energy left on the conductors by the inhibit drive pulse. Any other termination might cause reflections which at memory operating speeds might remain and overpower the small output signal at read time.

The nonreflective termination also is helpful in the differential sensing of output signals. The selected core, such as core 11, propagates the small output signal at opposite polarities in both directions along conductors 1 and 2 to the inputs of sense amplifier 4. The wire lengths in the two directions are not identical; the output signal arrives at the near input of the sense amplifier slightly earlier than its other half arrives at the far input. So long as the delay is small compared to the base-width of the output signal, the time delay only acts as a signal stretcher at the sense amplifier input terminals. If the termination should be reflective, however, reflections and rereflections might drastically modify the output signal waveform, making it hard to distinguish outputs. The characteristic impedance termination maintains the output signal waveform as a stretched out version of the core output pulse waveform.

The sense amplifier is gated by a strobe signal under control of strobe control pulse 26, to help distinguish genuine output signals from noise signals which might be present during the rise of the X and Y driver current. Data is made available immediately to a set of latches which are gated out under control of data control signal 27.

The read operation drives all cores of the word to the zero value. The cores of the word location are thus ready to receive information on the following "write" cycle.

It may be desired to retain the information, in which case a regeneration cycle takes place. It may, however, be desired to place new information into the word location, in which case in an operation identical to regeneration new information is placed in the word location. In either case, regeneration or new data writing, the word location is selected by X and Y current in the write direction and the data control is by selective inhibiting of certain of the cores. The X write current is provided as shown by pulse 28; Y write current is provided as shown by pulse 29. If nothing else occurs the combination of X pulse 28 and Y pulse 29 sets each of the cores of the word location to the "1" value. Selected cores, however, are traversed by a signal, according to pulse 30, which is oppositely polarized to X and Y pulses 28 and 29. The inhibit pulse provides a magnetic force to the core which is equal and opposite to the X pulse (or the Y pulse). The X and Y pulses each provide half-select current while the inhibit provides negative half-select current; the net result is that the core is affected by positive half-select current only. Positive half-select current alone is insufficient to switch the core. The inhibit feature thus has taken place. For those cores to which an inhibit current pulse is not provided the switching does take place and the cores are set to the "I" value.

Read time for the next cycle follows write time for the current cycle. It is thus necessary for measures to be taken to prevent the sense amplifiers for those cores which were supplied with inhibit current from being driven into the saturation state. A certain amount of time is provided for recovery and, as pointed out above in connection with FIGURE 1, measures are taken to provide for common mode rejection of the inhibit pulse.

*Structure*

Figure 3:
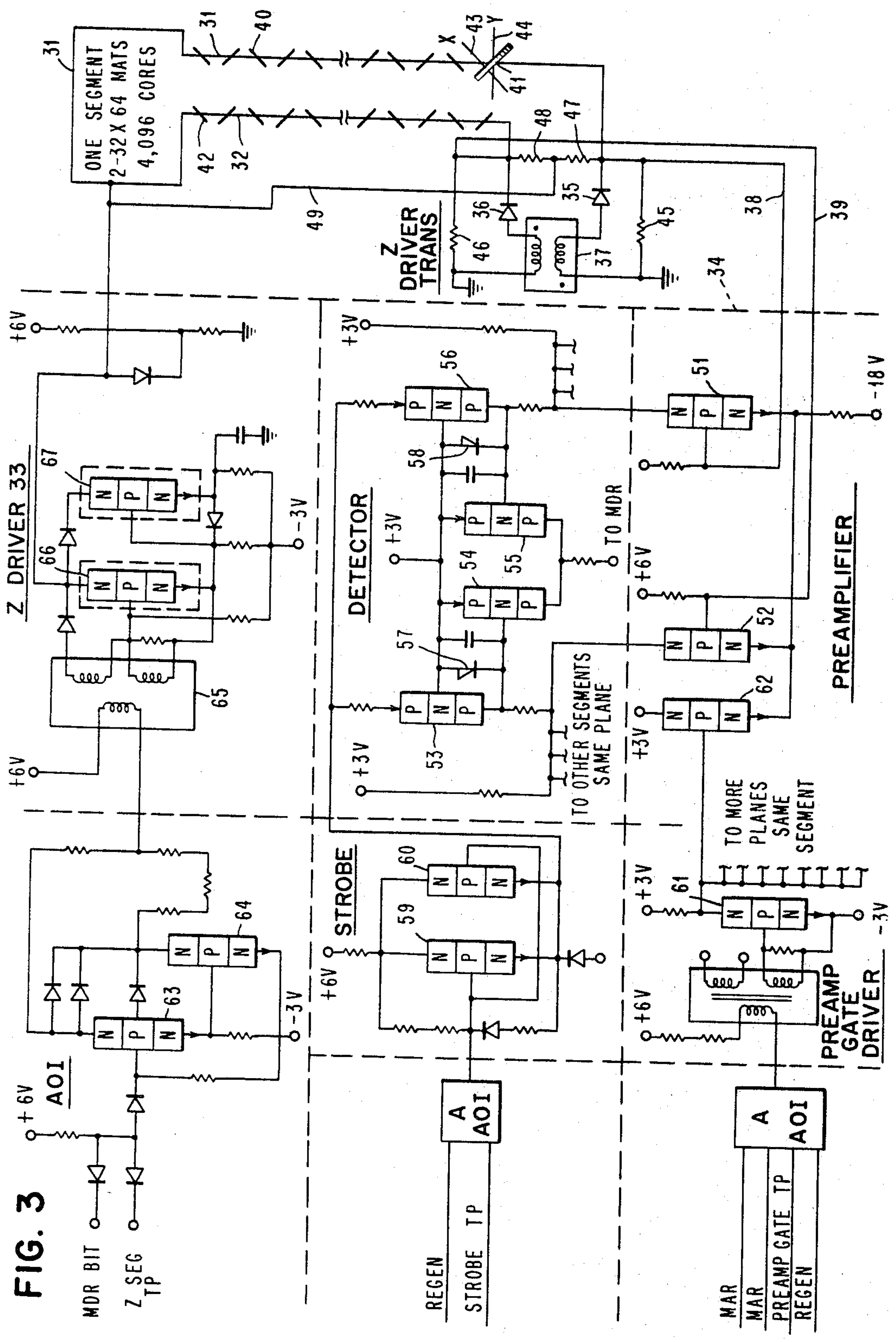
FIGURE 3 is a detailed schematic diagram of the invention.

FIGURE 3 is a detailed schematic diagram of the invention, showing the detailed structure of functional units in the system for operating two strings of cores on windings 31 and 32.

The output of Z-driver 33 provides inhibit drive current to the strings of cores on wires 31 and 32. Cores 40, 41 and 42 are identified. Core 41 is also traversed by X conductor 43 and Y conductor 44; other cores have appropriate X and Y conductors. Windings 31 and 32 terminate to ground via balancing transformer 37 and diodes 35–36 as well as characteristic impedance resistances 45–46. Resistances 47 and 48 are connected by conductor 49 to the output of Z-driver 33 to balance certain dynamic noise transients and to provide a termination for the cable connecting Z-driver 33 to the array.

Conductors 38 and 39 connect to the preamplifier transistors 51 and 52. The preamplifier transistors connect to detector transistors 53–56 and tunnel diodes 57 and 58. The detector provides output which sets the memory data register MDR (not shown). The detector is gated by a strobe circuit including transistors 59 and 60.

The preamplifier is gated by transistor 61 which is suitably controlled in time and position to cause acceptance of data. Gating the preamplifiers permits the XY selection of a group of cores greater than word size. Word selection is performed by gating the proper preamplifiers via gate drivers such as transistor 62.

Writing data into the cores is performed by selectively inhibiting according to the data valves in the memory data register. The MDR data controls the inhibit driver via input and circuits such as that made up of transistors 63 and 64.

Inhibit driver 33 includes input transformer 65 and power driver transistors 66 and 67 with heat sinks. An input pulse for writing or regenerating passes to the secondary of transformer 65 and causes conduction of both transistors 66 and 67.

*Final summary*

The invention is a common bit-sense circuit featuring a termination circuit in which resistors, diodes and a balancing transformer minimize the saturation of the sense amplifier while providing a nonreflective conductive path for the output signals. The diodes provide a low impedance termination for the bit drive signal, and, because the core outputs are too small to forward bias them, permit a characteristic impedance termination for the output signals.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a magnetic storage device of the type having for each bit position a differential sense amplifier, an inhibit driver, and a balanced bit-sense line pair coupled to storage elements of the bit position, the improvement comprising, means coupling said inhibit driver to one end of the bit-sense line pair and direct coupling said sense amplifier to the opposite end of the bit-sense line pair, whereby voltages produced on the bit-sense line pair during an inhibit operation tend to be canceled in the differential sense amplifier, first and second resistors connected between ground and said bit-sense line pair at the same sense amplifier end of the bit-sense line pair to terminate the line pair during a sensing operation, and first and second nonlinear asymetrical devices having a volt-ampere characteristic to limit the voltage at the sense amplifier terminals to a predetermined value during an inhibit operation, and means connecting said devices across said resistors.

2. A storage device according to claim 1 in which said asymetrical devices are diodes connected in a polarity to conduct inhibit current.

3. A storage device according to claim 2 in which said means connecting said diodes across said resistors comprises a transformer connected in circuit with the diodes to balance the inhibit current.

4. A storage device according to claim 2 in which said sense amplifier has at its input terminals a pair of transistors each having its base terminal connected to one of the bit-sense lines and being of a conductivity type to conduct in its base-emitter circuit oppositely to said diodes.

References Cited

UNITED STATES PATENTS

| | | | |
|---|---|---|---|
| 3,181,132 | 4/1965 | Amemiya | 340—174 |
| 3,209,337 | 9/1965 | Crawford | 340—174 |
| 3,319,233 | 5/1967 | Amemiya et al. | 340—174 |

BERNARD KONICK, *Primary Examiner.*

V. P. CANNEY, *Assistant Examiner.*